United States Patent [19]

Piber

[11] 4,163,136
[45] Jul. 31, 1979

[54] SNAP-IN MEANS FOR MOUNTING ELECTRICAL DEVICES OR THE LIKE IN A SUPPORT PANEL APERTURE

[75] Inventor: Earl T. Piber, Oconomowoc, Wis.

[73] Assignee: Cutler-Hammer, Inc., Milwaukee, Wis.

[21] Appl. No.: 777,962

[22] Filed: Mar. 16, 1977

Related U.S. Application Data

[63] Continuation of Ser. No. 632,637, Nov. 17, 1975, abandoned.

[51] Int. Cl.² .......................................... H01H 13/04
[52] U.S. Cl. .................................. 200/296; 174/153 G
[58] Field of Search ........................... 200/296, 295; 174/153 G; 248/27.1, 27.3; 339/128

[56] References Cited

U.S. PATENT DOCUMENTS

| | | | |
|---|---|---|---|
| 2,592,130 | 4/1952 | Erb et al. | 174/153 G X |
| 3,285,548 | 11/1966 | Matto et al. | 248/27.1 |
| 3,453,408 | 7/1969 | Mune | 200/295 |
| 3,941,965 | 3/1976 | Piber | 200/296 |

FOREIGN PATENT DOCUMENTS 1490415 of 1969 Fed. Rep. of Germany ...... 174/153 G

*Primary Examiner*—Harvey C. Hornsby
*Assistant Examiner*—Arthur O. Henderson
*Attorney, Agent, or Firm*—Michael, Best & Friedrich

[57] ABSTRACT

The snap-in mounting means includes a snap-in grommet carried on the shank of a bushing which extends from a switch frame mounted on a switch base of an electrical toggle switch assembly and pivotally supports a toggle lever for actuating switch contacts housed in the switch base. The snap-in grommet includes a radially yieldable sleeve slidably mounted on the lower end portion of the bushing shank, a tapered locking collar carried on the outer end of the sleeve and having a radially extending shoulder which engages the front of the panel around the panel mounting hole, after the collar has been squeezed through the hole during mounting, and a pair of opposed resilient back-up elements which are biased against the back of the panel to keep the locking collar shoulder in tight engagement with the front side of the panel. The bushing is pulled back after the locking collar has been squeezed through the panel mounting hole. As the bushing is moved axially relative to the grommet, a camming section on the outer end portion of the bushing having the shape of an inverted truncated cone cams the grommet sleeve radially outwardly into tight engagement with the inner wall of the hole to firmly lock the switch assembly to the panel. The bushing shank preferably includes a portion of reduced diameter between the lower end portion and the camming section so that, as the bushing is pulled back, the grommet sleeve slides onto the reduced portion with an audible snap, thereby providing a positive indication of the proper positioning of the grommet on the bushing.

8 Claims, 4 Drawing Figures

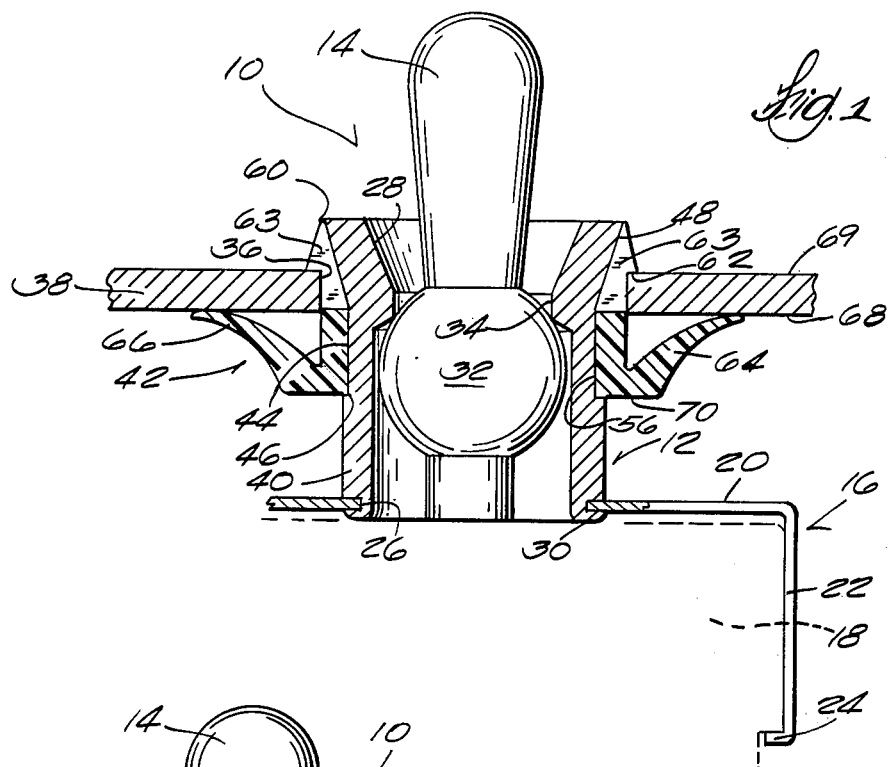
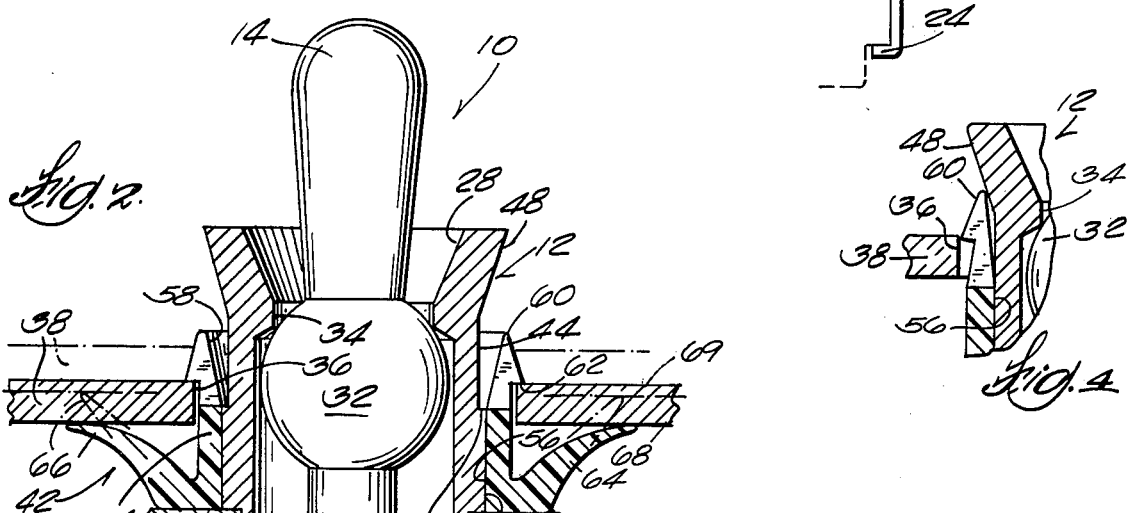
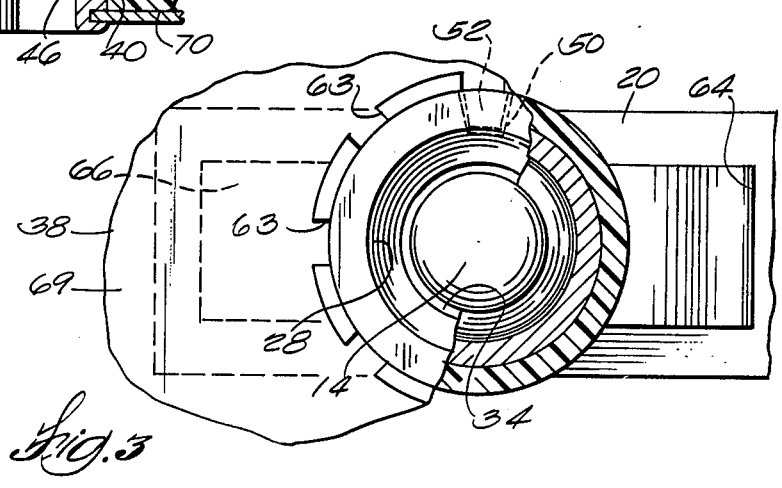

SNAP-IN MEANS FOR MOUNTING ELECTRICAL DEVICES OR THE LIKE IN A SUPPORT PANEL APERTURE

CROSS REFERENCE TO RELATED APPLICATIONS

This application is a continuation of application Ser. No. 632,637 filed Nov. 17, 1975 now abandoned.

BACKGROUND OF THE INVENTION

This invention relates to push-in or snap-in mounting means for mounting a device in the hole of a mounting panel, and, more particularly, to such mounting means adapted for use with electrical devices, such as a toggle switch or the like.

Push-in or snap-in mounting means for mounting devices, such as toggle switches and other electrical components, in a hole provided in a bulkhead or support panel are known. Prior art snap-in mounting constructions, particularly for rectangular mounting holes, typically have used biased fingers or the like which grip the edge of the mounting hole when the device is pressed into the panel mounting hole. Many prior art panel mounting means have relatively complex construction or require special tools for mounting and are not always completely satisfactory for the snap-in mounting of the circular bushings of a toggle switch because the mounting hole is not completely closed and/or the mount does not provide a smooth and neat appearance at the front of the panel.

SUMMARY OF THE INVENTION

An object of the invention is to provide a snap-in mounting means which is particularly adaptable for electrical switches or the like and is arranged to facilitate simple and quick installation into a mounting hole of a support panel without special tools.

Another object of the invention is to provide a snap-in mounting means for mounting a device, such as an electrical switch or the like, which can be inserted through a round mounting hole of a support panel from the back of the panel and presents a smooth and neat appearance from the front of the panel.

Other objects, aspects and advantages of the invention will become apparent upon reviewing the following detailed description, the drawing and the appended claims.

The snap-in mounting means provided by the invention includes a bushing having an outer end portion adapted to be received in the hole of a support panel on which the device is to be mounted. The bushing has a shank portion on which a grommet is slidably mounted and an enlarged camming section on the outer end extending from the outer extremity of the shank portion. The grommet includes a radially yieldable sleeve which has an outer diameter less than the panel mounting hole and is slidably received on the bushing shank portion and a tapered locking collar on the outer end of the sleeve which is squeezed through the panel mounting hole during mounting and has a shoulder which engages the front of the panel when the collar snaps back to its normal position after being squeezed through the hole. Biasing means is provided for urging the bushing in an axial direction away from the back of the panel to keep the locking collar shoulder in tight engagement with the front of the panel around the hole. As the bushing is subsequently pulled back relative to the grommet, the camming section thereof cams the grommet sleeve radially outwardly into tight engagement with the inner wall of the panel mounting hole to firmly lock the device to the panel.

In a preferred embodiment, the biasing means comprises a pair of opposed resilient back-up elements which extend integrally from the grommet sleeve and are biased against the back of the panel after mounting. In another preferred embodiment, the bushing shank has a first portion on which the grommet sleeve is initially received and a second portion of a reduced outer dimension onto which the grommet slides during pull back of the bushing. The inner edge of the grommet sleeve audibly snaps into engagement with the radially extending shoulder connecting the two shank portions, thereby providing a positive indication of the proper positioning of the grommet on the bushing.

BRIEF DESCRIPTION OF THE DRAWING

FIG. 1 is a fragmentary, partially sectioned, side elevation view of a one-hole, snap-in toggle switch assembly embodying various of the features of the invention shown mounted on a bulkhead or support panel.

FIG. 2 is a view similar to FIG. 1 showing the position of the various components after the bushing has been pressed into the panel mounting hole but prior to being pulled back.

FIG. 3 is a fragmentary, top view of the toggle switch assembly shown in FIG. 1 with a portion of the support panel, the bushing and the snap-in grommet broken away.

FIG. 4 is a fragmentary, cross sectional view of the support panel, the snap-in grommet and the bushing of FIG. 1 showing the position of the locking collar during initial insertion of the bushing into the panel mounting hole.

DESCRIPTION OF THE PREFERRED EMBODIMENTS

Illustrated in the drawing is a toggle switch assembly 10 embodying various features of the invention. The toggle switch assembly 10 includes an elongated bushing 12 having a generally circular cross section, a toggle lever 14, a switch frame 16 (illustrated fragmentarily in FIG. 1) and an insulating base 18 (illustrated schematically and fragmentarily by dashed lines in FIG. 1) which houses electrical contacts (not shown). The toggle lever 14 and the switch base 18 are of conventional design so detailed illustration and description of the structural features thereof is not necessary for a full understanding of the invention. For example, the Miller U.S. Pat. No. 3,146,330, issued Aug. 25, 1964, discloses a toggle switch assembly including a toggle lever and switch base arrangement adaptable for use in the invention. The switch frame 16 has a generally rectangular top 20 and a pair of depending legs 22 (one shown in FIG. 1) at the opposite ends thereof. Located on the lower end of each leg 22 is one or more tabs 24 which, upon assembly of the switch frame 16 and the switch base 18, are bent over into engagement with the switch base to secure the frame on the switch base with the top 20 covering the open top of the switch base.

The bushing 12 is mounted on top of the switch frame 16 and extends outwardly from the switch frame coaxially with a circular aperture 26 provided in the switch frame (FIG. 1). The bushing 12 has a central bore 28 for receiving the toggle lever 14. Located on the lower or inner end of the bushing 12 is a relatively thin, annular extension 30 which, upon assembly of the bushing on the switch frame, is swaged into engagement with the underside of the switch frame to securely fasten the bushing to the switch frame.

The toggle lever 14 has an external handle and extends through the bushing with the lower or inner end thereof extending into the switch base 18 for actuation of the switch contacts, for example, as disclosed in the above-identified Miller patent. The toggle lever 14 also includes an enlarged spherical portion 32 which bears against a constricted portion 34 of the bushing bore 28 to afford pivotal movement of the toggle lever relative to the bushing during actuating movement.

The outermost diameter of the bushing 12 is less than the inside diameter of a circular mounting hole 36 in a bulkhead or support panel 38 on which the switch assembly 10 is to be mounted from the rear or backside. The bushing 12 includes a first cylindrical shank portion 40 on the lower or inner end portion for slidably receiving a snap-in grommet which is generally designated by the reference numeral 42 and will be described below and a second cylindrical shank portion 44 of a reduced diameter extending upwardly or outwardly from the first shank portion 40. The shank portions 40 and 44 are integrally connected by a radially extending shoulder 46.

Located on the upper or outer end portion of the bushing 12 and extending from the upper or outer extremity of the second shank portion 44 is a camming section 48 which has an outer configuration of an inverted truncated cone. As alluded to above, the outermost diameter of the camming section 48 is smaller than the inside diameter of the panel mounting hole 36 so as to permit insertion of the bushing 12 therethrough. The bushing 12 can include an axially extending keyway 50 which registers with a keyway or lug 52 normally provided in the support panel mounting hole 36 to prevent the switch assembly 10 from turning after it has been mounted as shown in FIG. 3.

The snap-in grommet 42 is arranged to completely fill the panel mounting hole 36 after mounting and to cooperate with the bushing 12 to securely lock the switch assembly 10 to the support panel 38. More specifically, the grommet 42 has a radially yieldable tubular sleeve 54 which has an outer diameter less than the inside diameter of the panel mounting hole 36 and a central bore 56 which has an inside diameter approximating the outside diameter of the second shank portion 44 of the bushing 12. During assembly, the grommet sleeve 54 is slipped over the inner or lower end portion of the bushing 12 onto the first shank portion 44 prior to mounting the bushing on the switch frame 16. Since the inside diameter of the sleeve bore 56 is less than the outside diameter of the first shank portion 40, it must be stretched to some extent during installation. To facilitate this installation, the upper or outer portion 58 of the sleeve bore 56 preferably is tapered radially outwardly towards the outer end.

Located on the upper or outer end of the sleeve 54 is a generally annular locking collar 60 having a radially extending shoulder 62 which engages the front side of the support panel 38 around the mounting hole 36 when the switch assembly has been mounted on the panel as shown in FIG. 1. The outer surface of the locking collar 60 tapers from the outer end thereof radially outwardly and downwardly toward the shoulder 62 and the outer diameter of the upper or outer portion thereof is smaller and the outer diameter of the shoulder 62 is larger than the inside diameter of the panel mounting hole 36. The locking collar 60 is radially compressible and expandable with respect to the bushing 12 so as to permit it to be squeezed through the panel mounting hole 38 and thereafter snap back to its normal position during mounting as explained below. A plurality of circumferentially spaced slots 63 preferably are provided in the locking collar 60 and the upper portion of the sleeve 54, as best shown in FIG. 3, to facilitate the radial compression of the locking collar. Also, the locking collar and the sleeve include an axially extending slot which is aligned with the bushing keyway 50.

Extending laterally from the lower portion of the grommet sleeve 54 is an opposed pair of integral pressure or back-up elements 64 and 66 having a wing-like configuration, i.e., extend at an upwardly curved angle. The back-up elements 64 and 66 have some resiliency and are deflected downwardly when the bushing is pressed into the panel mounting hole. Thus, the back-up elements 64 and 66 apply a biasing force against the back of the panel and urge the bushing 12 in an axial direction away from the back of the panel to keep the locking collar shoulder 62 in tight engagement with the front of the panel after mounting.

In order to minimize fabrication costs, the snap-in grommet 42 preferably is formed as a one-piece unit from a relatively rigid moldable synthetic plastic material, such as a thermoplastic material "Lexan" marketed by General Electric, having sufficient resiliency to afford the above-described stretching of the sleeve 54, deflection of the back-up elements 64 and 66 and radial compression and expansion of the locking collar 60.

For mounting of the switch assembly 10, the outer end of the bushing 12 is inserted through the panel mounting hole 36 from the back 68 of the support panel 38. As the tapered locking collar 60 is moved through the hole, an intermediate portion thereof engages the inner wall of the hole, thereby providing a camming action for radially compressing the locking collar to permit it to be squeezed through the hole as shown in FIG. 4. Once the locking collar shoulder 62 has been moved past the front rim of the hole, the resilient character of the sleeve 54 causes the locking collar 60 to radially expand or "snap back" to its normal position where the shoulder 62 can engage the front side of the support panel as shown in FIG. 2. During this movement, the back-up elements 64 and 66 are deflected downwardly (from the dashed line position shown in FIG. 2) and provide a biasing force for holding the locking collar shoulder 62 in tight engagement with the front side of the support panel 38.

The bushing 12 is subsequently pulled back, i.e., moved in an axial direction away from the back of the panel, such as by gripping the switch frame 16 and pulling thereon. Since the locking collar shoulder 62 is in engagement with the front side of the panel, the bushing 12 is moved axially relative to the grommet 42 causing the sleeve 54 to slip off the first shank portion 40 onto the second shank portion 44 of the bushing 12. The resilient character of the grommet sleeve 54 causes the lower or inner edge 70 of the sleeve to audibly snap into engagement with the bushing shoulder 46, thereby providing a positive indication of the proper positioning of the grommet 42 on the bushing 12. While the bushing 12 is being pulled back, the camming section 48 engages the tapered upper portion 58 of the sleeve bore 56 and radially expands or spreads the sleeve 54 so that the outer surface thereof tightly engages the inner wall of the panel mounting hole 36 to firmly lock the switch assembly 10 to the support panel 38 as shown in FIG. 1. In order to provide a smooth appearance at the front of the panel, the bushing 12 and the grommet 42 preferably are arranged so that, upon completion of mounting, the outermost end of the bushing is substantially flush with the outer tip of the locking collar as shown in FIG. 1.

The switch assembly 10 can be removed by pushing hard on the back of the switch against the biasing force of the back-up elements 64 and 66 and then cutting off the locking collar portion of the grommet.

While the invention has been illustrated and described in connection with a bushing having a circular cross section and a circular panel mounting hole, it should be apparent that other shapes can be used so long as the grommet locking collar is arranged to engage the front of the panel and the sleeve engages the inner wall of the mounting hole after the bushing has been pulled back. Also, the snap-in mounting means of the invention can be used with other devices other than electrical components and with electrical devices having actuators other than toggle levers. Also, the shank portion of the bushing can have a substantially constant outer dimension so long as sufficient clearance is provided between the bushing and the grommet locking collar to permit the latter to be squeezed through the panel mounting hole during mounting. Furthermore, biasing means other than integral back-up elements 64 and 66 can be used. For instance, a coiled spring encircling the grommet and disposed between the switch frame and the back of the panel for compression during mounting can be used for this purpose.

While preferred embodiments of the invention have been illustrated and described in detail, it will be apparent to those skilled in the art that various changes and modifications can be made thereto to adapt the invention to various uses without departing from the scope of the invention as defined in the appended claims.

I claim:

1. A snap-in mounting means for a device adapting the device to be mounted from the back of and through a hole in a support panel to secure the device to the panel so that part of the device is accessible from the front of the panel comprising an elongated bushing carrying the accessible part of the device and adapted to be received in the panel mounting hole, said bushing including a first shank portion, a second shank portion of a reduced outer dimension, a radially extending shoulder integrally connecting said first and second shank portions and an enlarged camming section extending from the outer extremity of said second shank portion; a grommet including a radially yieldable sleeve slidably and stretchably mounted on said first bushing shank portion to form a subassembly and a radially outwardly tapered locking collar on the outer end of said sleeve, said grommet being axially spaced inwardly from said bushing camming section so that said bushing camming section initially extends beyond the outer end of said grommet, said sleeve terminating in an inner edge and having an outer dimension less than the dimension of the panel mounting hole to allow insertion of said subassembly partly through the hole, said locking collar having a cross section intermediate its ends approximating, but less than, the dimension of the panel mounting hole and terminating at the inner end in a shoulder extending radially outwardly from said sleeve to a dimension larger than the panel mounting hole, and biasing means for urging said grommet in an axial direction away from the back of the panel, said bushing and grommet subassembly being insertable as a unit through the panel mounting hole to compress said locking collar radially inwardly and permit passage thereof through the panel mounting hole and to stress said biasing means against the back of the panel with said locking collar thereafter expanding to its normal position where said locking collar shoulder engages the front side of the panel, said bushing being axially movable to permit it to be pulled back to slide axially within said grommet sleeve for engaging said bushing camming section with the interior of said grommet sleeve to cam said grommet sleeve radially outwardly into engagement with the inner edge of the panel mounting hole and further expand said locking collar on the front of the panel and for slipping said grommet sleeve off said first shank portion onto said reduced second shank portion and snapping said inner edge into engagement with said bushing shoulder, said grommet thereafter cooperating with said biasing means to hold said locking collar shoulder in tight engagement with the front side of the panel.

2. A snap-in mounting means according to claim 1 wherein said biasing means includes at least one resilient back-up element which extends laterally and integrally from said grommet sleeve and is biased against the backside of the panel after said grommet has been snapped into place on said second shank portion.

3. A snap-in mounting means according to claim 2 wherein the outer surface of said bushing camming section generally has the shape of an inverted truncated cone with respect to the direction of insertion.

4. A snap-in mounting means according to claim 3 wherein said grommet is a one-piece unit and is formed from a moldable synthetic plastic material.

5. A snap-in mounting means according to claim 1 wherein said device comprises a toggle switch including an insulating base housing switch contacts, a switch frame covering said base and a pivotal toggle lever for actuating the switch contacts, said bushing being mounted on and extending outwardly from said switch base and pivotally supporting said toggle lever.

6. A toggle switch assembly according to claim 4 wherein said biasing means includes at least one resilient back-up member which extends laterally and integrally from said grommet sleeve and is biased against the backside of the panel after said grommet has been snapped into place on said second shank portion.

7. A toggle switch assembly according to claim 6 wherein the outer surface of said bushing camming section generally has the shape of an inverted truncated cone with respect to the direction of insertion.

8. A toggle switch assembly according to claim 7 wherein said grommet is a one-piece unit and is formed from a moldable synthetic plastic material.

* * * * *